Patented June 6, 1933

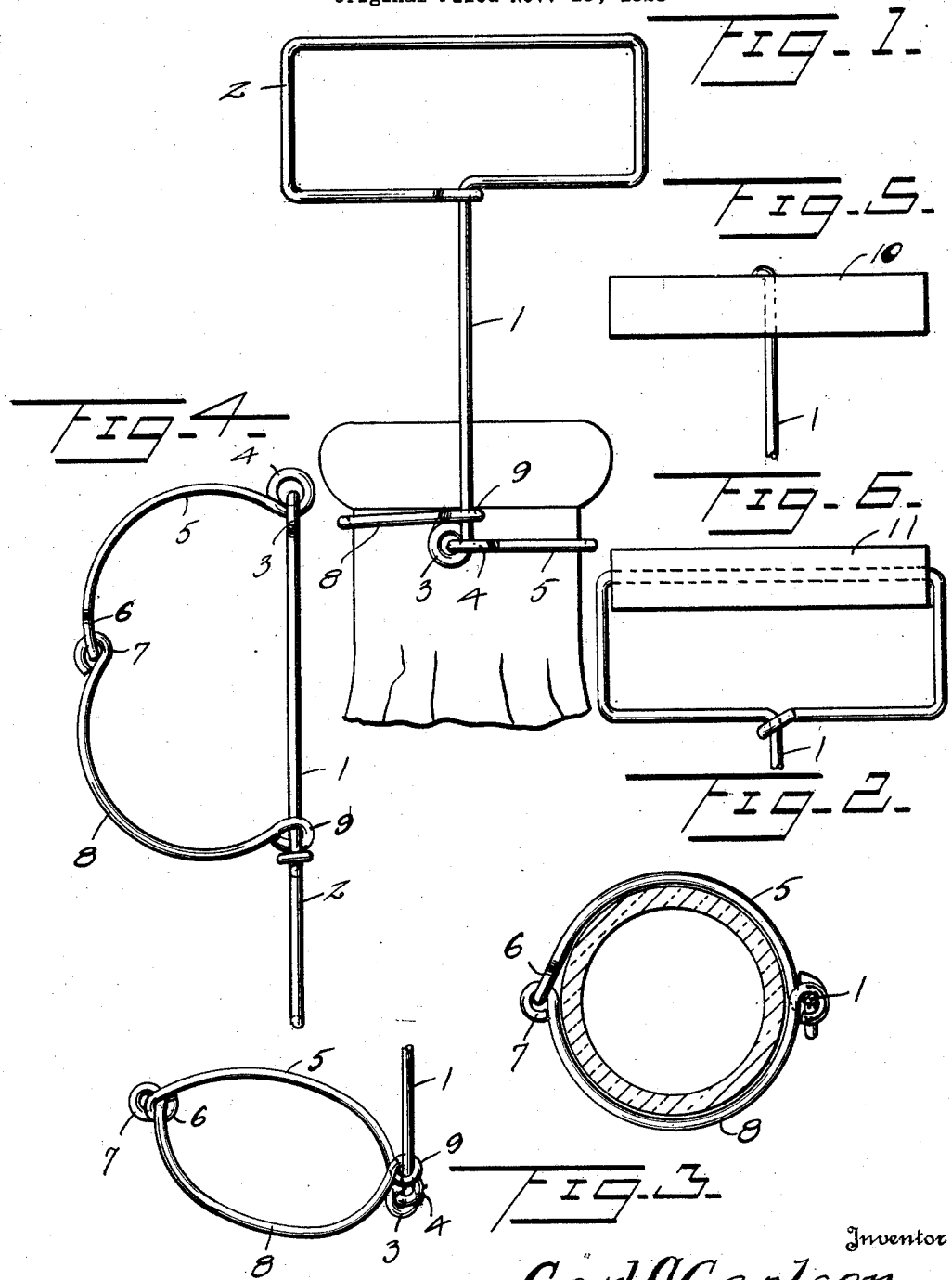

1,913,230

UNITED STATES PATENT OFFICE

CARL A. CARLSON, OF SPOKANE, WASHINGTON

BOTTLE CARRIER

Application filed November 13, 1928, Serial No. 319,166. Renewed November 22, 1932.

This invention relates to a handling device designed particularly for carrying milk bottles.

The primary object of the invention is to provide a carrying device for milk bottles which may be quickly and easily applied to and about the neck of a milk bottle and which may be easily loosened and released therefrom when the bottle is set down.

The invention broadly contemplates the provision of a short straight bar member having a handle at one end and at its other end having loose connection with one end of a substantially semi-circular body formed of wire or other suitable material. Attached to the other end of this semi-circular body is one end of a similarly formed body, the other end of which is slidably attached to the bar. When the shiftable end of the semi-circular body is moved down on the bar toward that end to which the first mentioned semi-circular body is attached a ring is formed which is designed to engage about the bottle neck. Sliding the free end of the shiftable body upwardly upon the bar opens the ring to such an extent that the mouth of the bottle will pass therethrough to permit release of the carrier from the neck thereof.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a side elevational view of the preferred form of the device embodying the present invention showing the same applied;

Figure 2 is a transverse sectional view of the bottle neck shown in Figure 1 looking downwardly on the neck engaging portion of the device;

Figure 3 is a detail perspective view of the bottle neck engaging portion of the device;

Figure 4 is a plan view of the structure shown in Figure 3 showing the same opened;

Figure 5 shows one modification of the handle portion of the device;

Figure 6 shows a further modification of the handle structure.

Referring to the drawing in detail wherein like numerals of reference indicate corresponding parts throughout the several views, the numeral 1 indicates the bar or body portion of the bottle carrying device embodying the present invention, this bar being preferably constructed of heavy gauge wire so that a portion at one end may be suitably looped to form a handle 2 in the manner shown.

The opposite end of the bar 1 is formed to provide the loop or eye 3 and loosely engaged with this eye is the eye 4 of a substantially semi-circular body 5 which body is also preferably formed of the heavy gauge wire of which the bar or body 1 is formed. This semi-circular body has its other end formed to provide the eye 6 through which is loosely engaged an eye 7 formed at one end of a semi-circular body 8, the opposite end of this body being formed to provide the eye 9 through which the body 1 extends, this eye being slidable longitudinally on the body in the manner shown.

It will be readily seen that when the carrying bar or body 1 is held in vertical position the shiftable end of the body 8 will move downwardly thereon and rest upon the looped portion 3 of the body so that the two semi-circular members 5 and 8 form together a ring. This ring is designed to engage about the neck of a milk bottle beneath the mouth or lip thereof and the weight of the bottle upon the semi-circular members will hold them tightly thereabout.

In order to insert the bottle mouth to position between the members 5 and 8, the free or sliding end of the member 8 is shifted on the bar 1 toward the handle or away from the point where the member 5 is connected. This swings the bar attached end of the member 5 and the shiftable end of the member 8 widely apart so that the bottle mouth may be readily inserted between these two members.

While I have shown as the preferred form of my invention a formed wire body in which a handle 2 is integrally connected at one end, it is of course obvious that other methods of providing carrying handles may be employed, as for example, as shown in Figure 5. The bar 1 may have one end extended through or looped about the central portion of a solid handle body 10 formed of suitable material such as wood or the like, or, the broad loop 2 formed from the material of the bar 1 may have a hand grip 11 mounted upon the top bar thereof as shown in the modified structure of Figure 6.

From the foregoing description it will be readily appreciated that a device embodying the present invention may be easily and quickly applied to or removed from a milk bottle and that its use will materially expedite the handling of such bottles, as an example, a milk man delivering milk may carry a large number of bottles each equipped with one of these devices and after all of the bottles have been delivered they may be easily disposed of by placing them in the pocket. This does away with the necessity of handling the usual clumsy and heavy wire baskets of the type at present employed for carrying milk bottles.

Having thus described my invention, what I claim is:—

1. A bottle carrying device of the character described, comprising a pair of substantially semi-circular loosely but permanently connected members designed to form a ring about a bottle neck, a straight handle shank having a connection between one end and a free end of a member, whereby it may be disposed at right angles to a plane occupied by the formed ring, and a sliding connection between the shank and the free end of the other member whereby the free end of the said other member may slide on and throughout the length of the shank relative to the said free end of the member adjacent thereto.

2. A bottle carrier, comprising a pair of members loosely but permanently connected together and adapted to join to form a ring about a bottle neck, and a handle having a straight shank having universal connection between one end and one end of one of said members, whereby the shank may be swung to a position longitudinally of and at the side of the bottle neck when the said ring is in position thereabout, the other member having one end attached to and slidable on the handle shank.

In testimony whereof I hereunto affix my signature.

CARL A. CARLSON.